(12) United States Patent
Rice

(10) Patent No.: X6839
(45) Date of Patent: Nov. 14, 1831

(54) SPINNING COTTON & WOOL

(76) Inventor: Levi Rice

Levi Rice
Letters Patent

The Schedule referred to in these Letters Patent and making part of the same containing a description in the words of the said Levi Rice himself of his Improvement in the machine for spinning cotton and wool

---

To all to whom these presents may come. Be it known that I Levi Rice of Milburn in the County of Somerset and State of Maine have invented a new and useful improvement in a machine for spinning cotton or wool and that the following is a full and exact description of the construction and operation of the said machine as invented or improved by me. A. A. represent the wheels by which the machine is put in motion. B.B. the bands on the said wheels by which the spindles are made to revolve by the improvement of friction rollers and C. C. are the spindles on which the thread is wound or taken up. D. is a wire suspended in the machine for the purpose of conducting the yarn or thread to the spindles. E. represents a small beam or timber passing across the machine and moving up and down in grooves in the side timbers by which means the rolls are roped and prepared for use and thence conveyed to the spindles aforesaid. F. in the end view of the machine represents the mode of placing the cranks which are marked A. in the other views of the machine. The said machine may be driven by the hand of a single person, or by water, wind, steam, or any other motive power, and may be used and it is the intention of the Patentee to use it in any upright, inclining, or horizontal position. The Patentee more particularly claims the right of the improvement of putting any number of spindles in motion by one band by the improvement of the friction rollers. consequently the yarn or thread on each spindle is twisted equally even or alike, which cannot be done with a band to each spindle. the spindles may be

United States Patent

Patent No.: X6839 be placed in a curve or straight line

Ebenezer H. Neil } Seth Rice

John L. Neil }

Witnesses

Exd 413 words

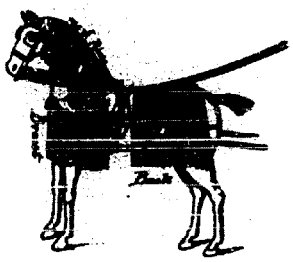

United States Patent
Patent No.: X6839
H. Horn,
Fly Net,
Patented Dec. 8, 1831.
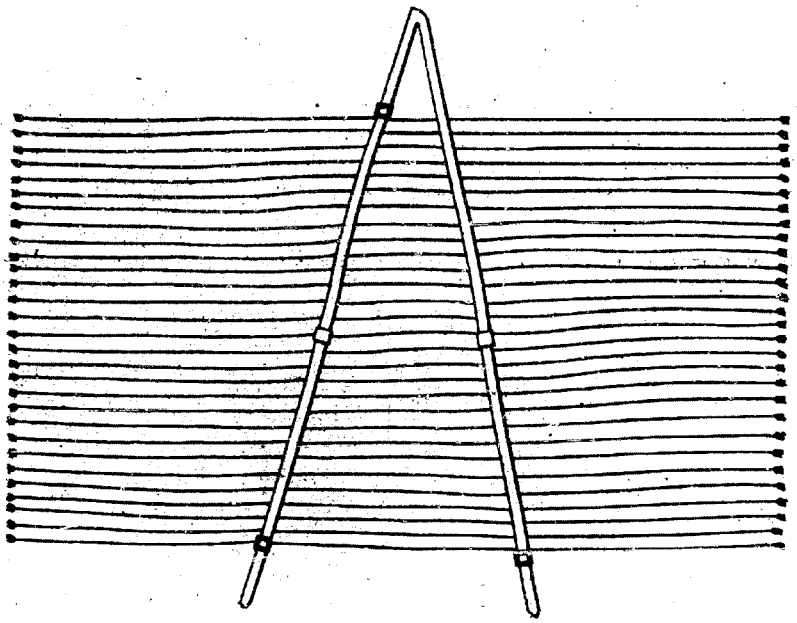
Side view.